(12) United States Patent
Shah

(10) Patent No.: US 9,852,003 B2
(45) Date of Patent: Dec. 26, 2017

(54) SYSTEMS AND METHODS FOR GENERATING A UNIQUE FINGERPRINT AGGREGATING SET OF UNIQUE TRACKING IDENTIFIERS THROUGHOUT REQUEST/RESPONSE PROCESSING

(71) Applicant: Rovi Guides, Inc., Santa Clara, CA (US)

(72) Inventor: Sandipkumar V. Shah, San Jose, CA (US)

(73) Assignee: Rovi Guides, Inc., San Carlos, CA (US)

( * ) Notice: Subject to any disclaimer, the term of this patent is extended or adjusted under 35 U.S.C. 154(b) by 118 days.

(21) Appl. No.: 14/529,643

(22) Filed: Oct. 31, 2014

(65) Prior Publication Data

US 2016/0127487 A1 May 5, 2016

(51) Int. Cl.
*G06F 15/16* (2006.01)
*G06F 9/46* (2006.01)
*H04L 12/26* (2006.01)
*G06F 11/30* (2006.01)

(52) U.S. Cl.
CPC .......... *G06F 9/465* (2013.01); *G06F 11/3006* (2013.01); *H04L 12/2602* (2013.01)

(58) Field of Classification Search
CPC ... G06F 9/465; G06F 11/3006; H04L 12/2602
USPC ....................... 709/204, 220, 224
See application file for complete search history.

(56) References Cited

U.S. PATENT DOCUMENTS

| 2003/0153328 | A1* | 8/2003 | Booth | H04W 12/12 455/456.1 |
| 2008/0195620 | A1* | 8/2008 | Abanami | H04W 8/005 |
| 2009/0031008 | A1* | 1/2009 | Elliott | H04L 61/1517 709/220 |
| 2012/0210436 | A1 | 8/2012 | Rouse | |
| 2013/0117847 | A1 | 5/2013 | Friedman et al. | |
| 2013/0124309 | A1* | 5/2013 | Traasdahl | H04L 67/22 705/14.49 |

(Continued)

FOREIGN PATENT DOCUMENTS

WO    WO2009/156733    12/2009

*Primary Examiner* — Joseph E Avellino
*Assistant Examiner* — Marshall McLeod
(74) *Attorney, Agent, or Firm* — Haley Guiliano LLP

(57) ABSTRACT

Systems and methods for generating a fingerprint including multiple tracking identifiers. Control circuitry receives a first tracking identifier from a first component of a network. The first tracking identifier is associated with a data request sent to the first component. The control circuitry identifies parameters based on a configuration of the first component. The control circuitry transmits an application programming interface (API) request for information related to the parameters from the first component. The control circuitry receives information related to the parameters for the first component in response to the API request. The control circuitry determines a second tracking identifier based on the first tracking identifier and the information related to the parameters for the first component. The control circuitry transmits the second tracking identifier to the first component. The first tracking identifier and the second tracking identifier are combined to generate a fingerprint in connection with the data request.

22 Claims, 6 Drawing Sheets

(56) References Cited

U.S. PATENT DOCUMENTS

2014/0105038 A1    4/2014  Yu et al.
2014/0122885 A1*  5/2014  Wu .................... H04L 29/06
                                                    713/171
2015/0026330 A1*  1/2015  Ahmed ................ G06F 21/73
                                                    709/224

* cited by examiner

700

702 — <TRACKING IDENTIFIER>
    704 — <DATA REQUEST ID> f81d4fae-7dec-11d0-a765-00a0c91e6bf6 </DATA REQUEST ID>
    706 — <COMPONENT>
        708 — <COMPONENT ID> F1 </COMPONENT ID>
        710 — <APPLICATION PARAMETERS>
            712 — <NAME> APACHE </NAME>
            714 — <ACTIVE CONNECTIONS> 50 </ACTIVE CONNECTIONS>
            716 — <CACHE> 1MB </CACHE>
            718 — <PID> 3434 </PID>
            720 — <CPU> 22% </CPU>
            722 — <MEMORY> 1MB </MEMORY>
        724 — </APPLICATION PARAMETERS>
        726 — <COMPUTE PARAMETERS>
            728 — <CPU USAGE> 50%</CPU USAGE>
            730 — <THREADS> 256</THREADS>
        732 — </COMPUTE PARAMETERS>
        734 — <STORAGE PARAMETERS>
            736 — <LOCAL DISK SPACE> 1 TB </LOCAL DISK SPACE>
            738 — <USED SPACE> 752 GB </USED SPACE>
            740 — <AVAILABLE SPACE> 272 GB <AVAILABLE SPACE>
        742 — </STORAGE PARAMETERS>
        744 — <NETWORK PARAMETERS>
            746 — <IP> 192.168.1.1 </IP>
            748 — <PORT> 32768 </PORT>
            750 — <NETWORK> LOCAL AREA NETWORK </NETWORK>
            752 — <IO> ETHERNET </IO>
        754 — </NETWORK PARAMETERS>
    756 — </COMPONENT>
    758 — <COMPONENT>
        760 — <COMPONENT ID> F2 </COMPONENT ID>
        ...
    762 — </COMPONENT>
764 — </TRACKING IDENTIFIER>

FIG. 7

SYSTEMS AND METHODS FOR GENERATING A UNIQUE FINGERPRINT AGGREGATING SET OF UNIQUE TRACKING IDENTIFIERS THROUGHOUT REQUEST/RESPONSE PROCESSING

BACKGROUND

Interactive media devices may receive media content from a network of multiple components, e.g., a server-client network or a cloud-based network. Such a network may be locally based or spread geographically across multiple physical locations. The network may service a large number of users and receive a large volume of requests to be fulfilled in a short period of time. For example, multiple interactive media devices such as smart phones may request a live stream of a certain event in a short period of time. However, the network may be unable to handle the requests at such a rate and fail to fulfill every request as expected. For example, a user's data request may result in a retrieval error, a request time out, or other such responses from the network.

SUMMARY

Systems and methods are described herein for generating tracking identifiers in a network of multiple components, e.g., a server-client network, a cloud-based network, or another suitable network. A data request received from an end-user, e.g., a request for an audio packet, a video packet, or another suitable data request, may traverse through multiple components in the network in order to be fulfilled. For example, a data request from a user's smart phone may be received by a component in the network. The component may relay the data request to one or more components in the network to retrieve the requested data packet and respond to the user's smart phone with the requested data packet. However, if the network is serving a large number of users in a short period of time or having technical problems or another suitable issue that may delay or fail to fulfill the data request, the user's smart phone may receive an error accordingly.

In order to address the network issues, a troubleshooting system may rely on information associated with the data request to determine the source of the issues. The troubleshooting system may automatically analyze the network issues based on information received from one or more hardware and/or software modules distributed in the network. Particularly, the data request may be associated with a fingerprint including a plurality of tracking identifiers that track the network components that the data request traversed through and provides information regarding the network components. The fingerprint may be retrieved in response to an Application Programming Interface (API) call from the troubleshooting system. For example, the fingerprint may include tracking identifiers of each network component that received the data request. The tracking identifiers may be combined to form the fingerprint. In some embodiments, tracking identifiers are generated at each processing level including processor, storage, application software, and other suitable levels. The tracking identifiers are combined to generate a unique fingerprint in connection with the data request.

The tracking identifier may include information related to one or more applications running on the component, the infrastructure of the component, compute capabilities of the component, storage capabilities of the component, network capabilities of the component, and other suitable information. The tracking identifier may uniquely identify the physical state and/or temporal state of the component. The tracking identifier may include information regarding the application stack for each component. For example, the information regarding the application stack may include web server information (e.g., TOMCAT, JBOSS, APACHE, ISS, or any other suitable application), database information (e.g., MYSQL, ORACLE, MONGODB, or any other suitable application, cache information (e.g., VARMISH, MEMCACHED, or any other suitable application), queue information (e.g., RABBIT MQ or any other suitable application), software stack information (e.g., JAVA, PHP, PYTHON, C++, or any other suitable application), and any other suitable information regarding the application stack. The troubleshooting system may review the information in the tracking identifier to automatically identify issues that may have resulted in delay and/or failure in fulfilling the data request.

The information in the tracking identifier may help track the network components the data request has traversed. Particularly, the troubleshooting system may review which resources may have potentially caused the delay and/or failure in fulfilling the data request. For example, an application running on the network component may have experienced a fault and resulted in the error. In another example, a physical device of the network component, such as a storage device or a network adapter, may have experienced a fault and resulted in the error. The troubleshooting system may automatically plan ahead based on the information in the tracking identifier. For example, the troubleshooting system may reroute data requests based on the gathered information while the network component is repaired. In another example, the troubleshooting system may reduce the frequency of data requests based on the gathered information in order to allow the network component to satisfy the data requests in a timely manner.

In some aspects, the tracking identifier is generated by a combination of software and/or hardware modules distributed in the network. In some embodiments, the tracking identifier is generated by a software module implemented on each component in the network. In some embodiments, the tracking identifier is generated by a hardware module implemented on each component in the network. In some embodiments, the tracking identifier is generated by a stand-alone component in the network. The stand-alone component may include hardware and/or software to receive tracking identifiers and update them with information regarding the latest component that received the data request associated with the tracking identifier.

In some embodiments, the tracking identifier generation module includes control circuitry that receives a tracking identifier from a component in the network. For example, the component may be a media content source, a media guidance data source, or another suitable network component. The tracking identifier is related to a data request received at the component and may be transmitted along with or separate from the data request. The tracking identifier may include a data structure having information regarding prior components in the network that the data request has traversed. For example, the tracking identifier may include information regarding a component in the network that first received the data request from an end user's smart phone. The component then relayed the data request along with the tracking identifier including the component's information to the component under consideration.

For example, the tracking identifier may include information regarding the component that first received the data request. The tracking identifier may include information regarding the application stack for the component. The tracking identifier may include information related to one or more applications running on the component, the infrastructure of the component, compute parameters of the component, storage parameters of the component, network parameters of the component, and other suitable parameters. The application parameters may include information regarding the application on the component including name, active connections, cache size, process identifier, CPU usage, memory usage, and other suitable information. The infrastructure parameters may include information regarding one or more of the compute capabilities of the component, the storage capabilities of the component, the network capabilities of the component, and other suitable information. The compute parameters may include overall CPU usage, number of threads being executed, cache usage, temperature, and other suitable information. The storage parameters may include disk space size, disk space used, disk space available, and other suitable information. The network parameters may include IP address, port number, network type, input/output type, and other suitable information. The tracking identifier may include information regarding the application stack for the component. By capturing such information in the tracking identifier, the control circuitry of the tracking identifier generation module may record information for uniquely identifying the physical state and/or temporal state of the component.

Subsequent to receiving the tracking identifier containing information regarding prior components the related data request has traversed, the control circuitry of the tracking identifier generation module may identify parameters related to the component under consideration. The control circuitry may update the tracking identifier to include information for uniquely identifying the physical state and/or temporal state of the component, e.g., information regarding the application stack of the component. The control circuitry may identify the parameters based on the configuration of the component. For example, the identified parameters may be a subset of the configuration of the component, such as infrastructure parameters, compute parameters, storage parameters, network parameters, application parameters, and other suitable parameters. The configuration may be retrieved from the component itself, a database within the network, or another suitable source. In some embodiments, the identified parameters may be determined based on the type of data request associated with the tracking identifier. For example, the identified parameters for a video packet request may include application parameters for a video related application and related hardware running the video related application. In another example, the identified parameters for an audio packet request may include application parameters for an audio related application and related hardware running the audio related application. The control circuitry may request and receive information related to the identified parameters from the component. The control circuitry may update the data structure of the tracking identifier to include the received information regarding the component under consideration.

In some embodiments, the component that received the data request passes the request to another component in the network along with the updated tracking identifier. This component may subsequently send the received tracking identifier to the tracking identifier generation module to include information regarding the component. The tracking identifier may be updated to also include information regarding a physical state and/or a temporal state of this component as well. As such, the tracking identifier may be updated to include information related to each component through which the data request passes in the network.

In some aspects, the systems and methods described herein provide for a system for generating tracking identifiers in a network. The system includes control circuitry that receives a first tracking identifier from a first component of the network. The first tracking identifier is associated with a data request sent to the first component. The control circuitry identifies parameters based on a configuration of the first component of the network. The control circuitry transmits an API request for information related to the parameters from the first component of the network. The control circuitry receives the information related to the parameters for the first component of the network in response to the API request. The control circuitry determines a second tracking identifier based on the first tracking identifier and the information related to the parameters for the first component of the network. The control circuitry transmits the second tracking identifier to the first component of the network.

In some embodiments, the first component of the network received the first tracking identifier in connection with the data request.

In some embodiments, the first tracking identifier and the second tracking identifier are combined to generate a fingerprint in connection with the data request. In some embodiments, tracking identifiers are generated at each processing level including processor, storage, application software, and other suitable levels. The tracking identifiers are combined to generate a unique fingerprint in connection with the data request.

In some embodiments, the first tracking identifier includes information regarding prior components of the network that the data request has passed through prior to the first component.

In some embodiments, the first tracking identifier includes a data structure having information related to an application of the prior components, a processor of the prior components, a storage device of the prior components, a network interface of the prior components, or any other suitable information for the prior components.

In some embodiments, the first tracking identifier uniquely identifies a physical state and/or a temporal state for the prior components of the network.

In some embodiments, the configuration of the first component is retrieved from the first component, a database identifying components of the network, or another suitable source.

In some embodiments, determining the second tracking identifier includes modifying the first tracking identifier to include at least a portion of the information related to the parameters for the first component of the network.

In some embodiments, the configuration of the first component of the network includes infrastructure parameters, compute parameters, storage parameters, network parameters, application parameters, and/or other suitable parameters for the first component.

In some embodiments, the control circuitry receives the second tracking identifier from a second component of the network. The second tracking identifier is associated with the data request passing from the first component to the second component.

In some embodiments, the control circuitry modifies the second tracking identifier to include information related to the second component of the network, thereby including information related to the first component and the second component through which the data request has passed.

In some aspects, the systems and methods described herein include a method, an apparatus, or non-transitory machine-readable media for searching for a media asset configured to execute the functionality described above.

It should be noted, the systems and/or methods described above may be applied to, or used in accordance with, other systems, methods and/or apparatuses.

BRIEF DESCRIPTION OF THE DRAWINGS

The above and other objects and advantages of the disclosure will be apparent under consideration of the following detailed description, taken in conjunction with the accompanying drawings, in which like reference characters refer to like parts throughout, and in which:

FIG. 7 shows an illustrative embodiment of a tracking identifier associated with a data request, in accordance with some embodiments of the disclosure.

DESCRIPTION

Figure 1:
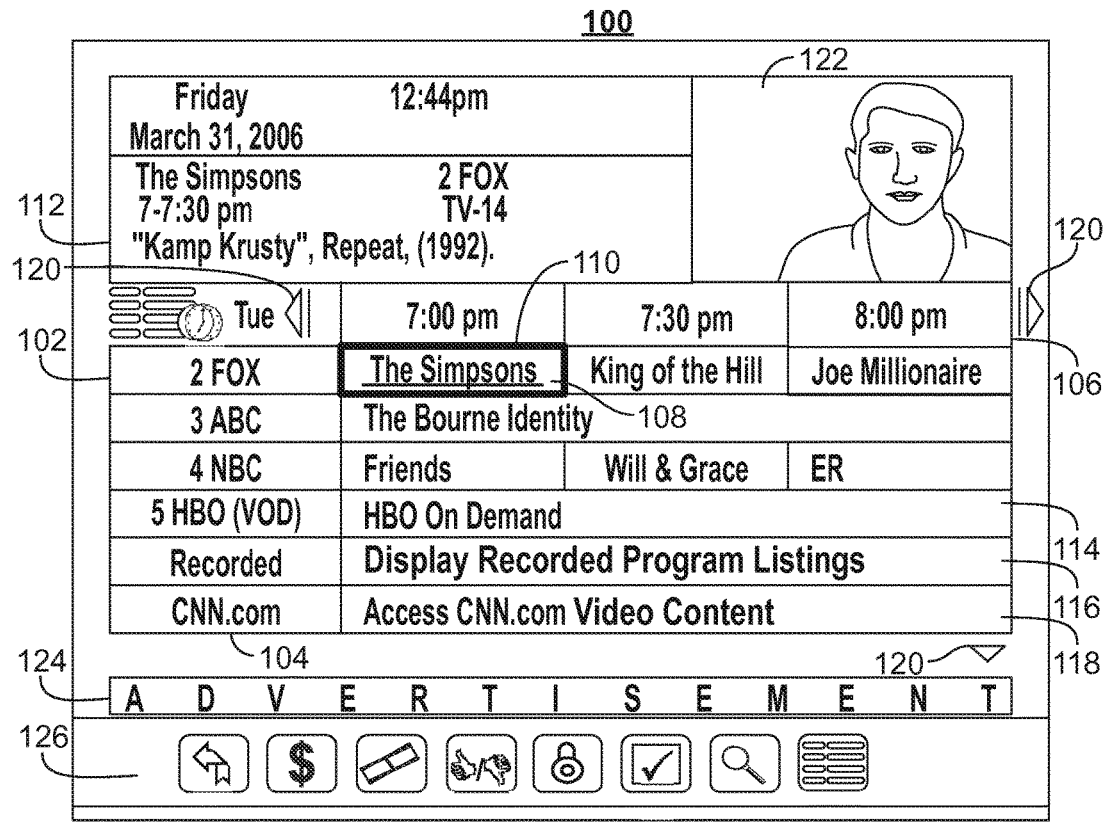
FIGS. 1 and 2 show illustrative display screens that may be used to provide media guidance application listings in accordance with some embodiments of the present disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
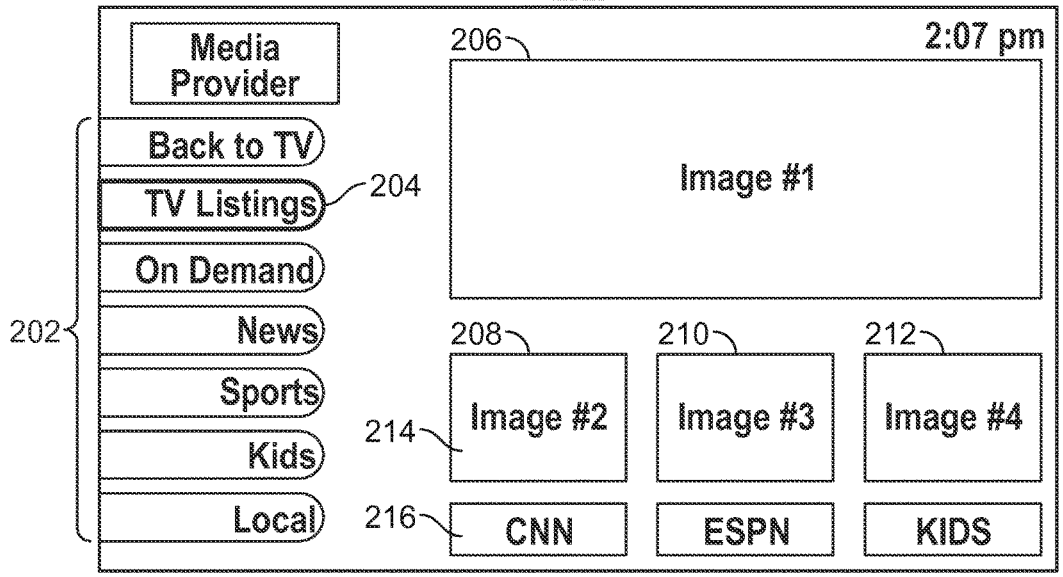

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows an illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102.

This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
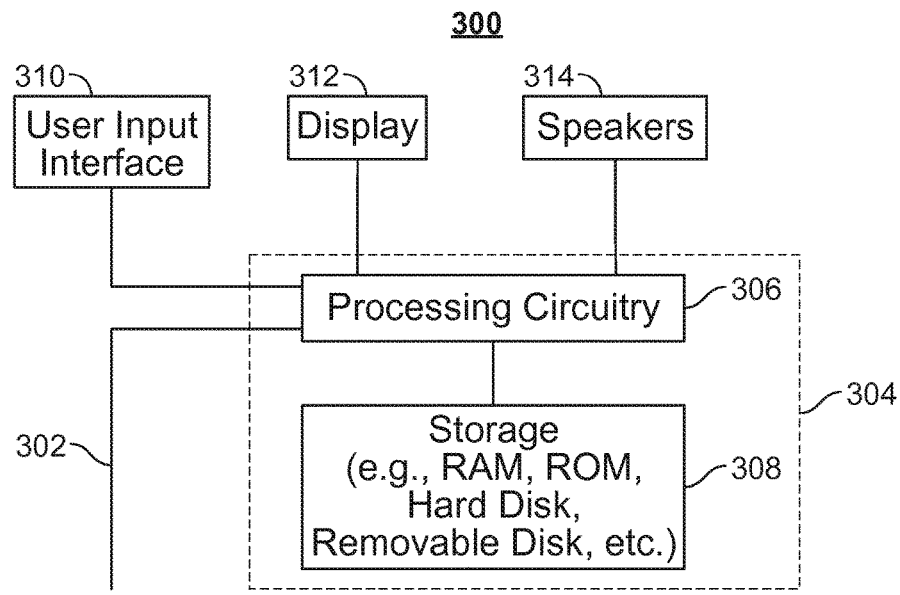
FIG. 3 shows an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

In some embodiments, user equipment device 300 includes control circuitry 304 that receives a tracking identifier from a component in a network. For example, the component may be a media content source, a media guidance data source, or another suitable network component. The tracking identifier is related to a data request received at the component and may be transmitted along with or separate from the data request. The tracking identifier may include a data structure having information regarding prior components in the network that the data request has traversed.

Subsequent to receiving the tracking identifier containing information regarding prior components the related data request has traversed, control circuitry 304 may identify parameters related to the component under consideration. Control circuitry 304 may update the tracking identifier to include information for uniquely identifying the physical state and/or temporal state of the component, e.g., information regarding the application stack of the component. Control circuitry 304 may identify the parameters based on the configuration of the component. For example, the identified parameters may be a subset of the configuration of the component, such as infrastructure parameters, compute parameters, storage parameters, network parameters, application parameters, and other suitable parameters. The configuration may be retrieved from the component itself, a database within the network, or another suitable source. In some embodiments, the identified parameters may be determined based on the type of data request associated with the tracking identifier. For example, the identified parameters for a video packet request may include application parameters for a video related application and related hardware running the video related application. In another example, the identified parameters for an audio packet request may include application parameters for an audio related application and related hardware running the audio related application. Control circuitry 304 may request and receive information related to the identified parameters from the component. Control circuitry 304 may update the data structure of the tracking identifier to include the received information regarding the component under consideration.

Figure 4:
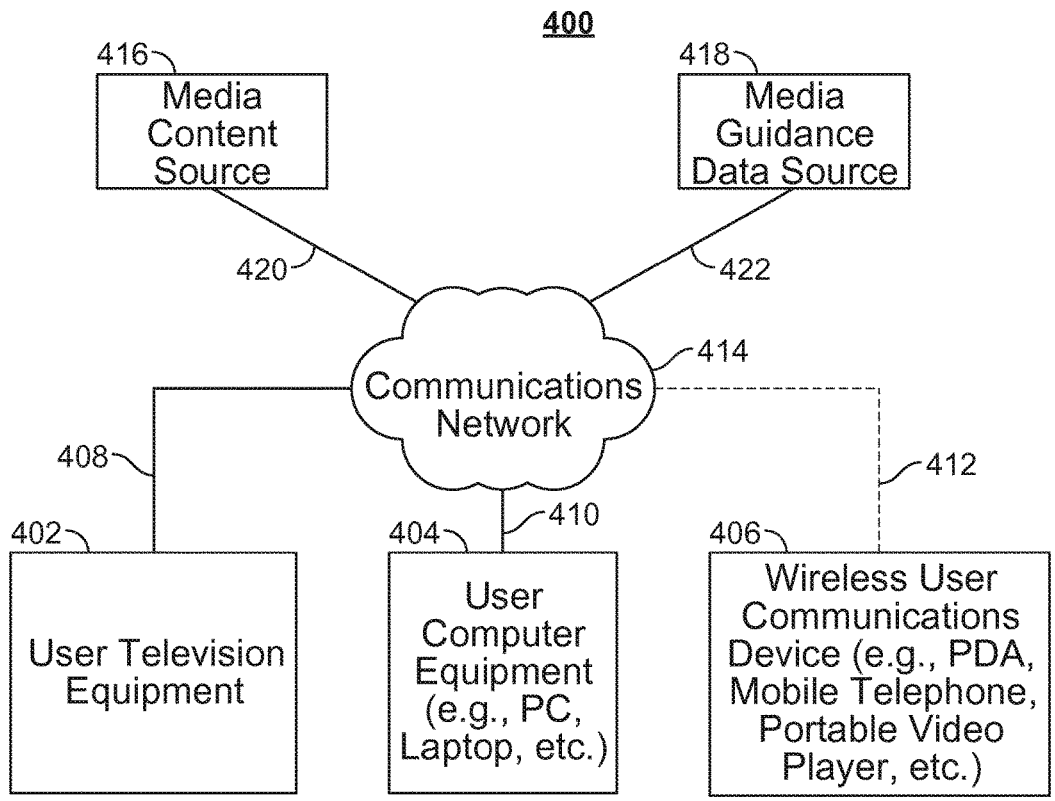
FIG. 4 is a diagram of an illustrative cross-platform interactive media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry 304 of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A data request received from an end-user, e.g., a request for an audio packet, a video packet, or another suitable data request, may traverse through multiple components in the cloud in order to be fulfilled. For example, a data request from a user's smart phone may be received by a component in the cloud. The component may relay the data request to one or more components in the cloud to retrieve the requested data packet and respond to the user's smart phone with the requested data packet. However, if the cloud is serving a large number of users in a short period of time or having technical problems or another suitable issue that may delay or fail to fulfill the data request, the user's smart phone may receive an error accordingly.

In order to address the issues, a troubleshooting system may rely on information associated with the data request to determine the source of the issues. The troubleshooting system may automatically analyze the cloud based on information received from one or more hardware and/or software modules distributed in the cloud. Particularly, the data request may be associated with a tracking identifier that tracks the cloud components that the data request traversed through and provides information regarding the cloud components. The tracking identifier may uniquely identify the physical state and/or temporal state of the component. The tracking identifier may include information regarding the application stack for each component. For example, the information regarding the application stack may include web server information (e.g., TOMCAT, JBOSS, APACHE, ISS, or any other suitable application), database information (e.g., MYSQL, ORACLE, MONGODB, or any other suitable application), cache information (e.g., VARMISH, MEMCACHED, or any other suitable application), queue information (e.g., RABBIT MQ or any other suitable application), software stack information (e.g., JAVA, PHP, PYTHON, C++, or any other suitable application), and any other suitable information regarding the application stack. The troubleshooting system may review the information in the tracking identifier to automatically identify issues that may have resulted in delay and/or failure in fulfilling the data request.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
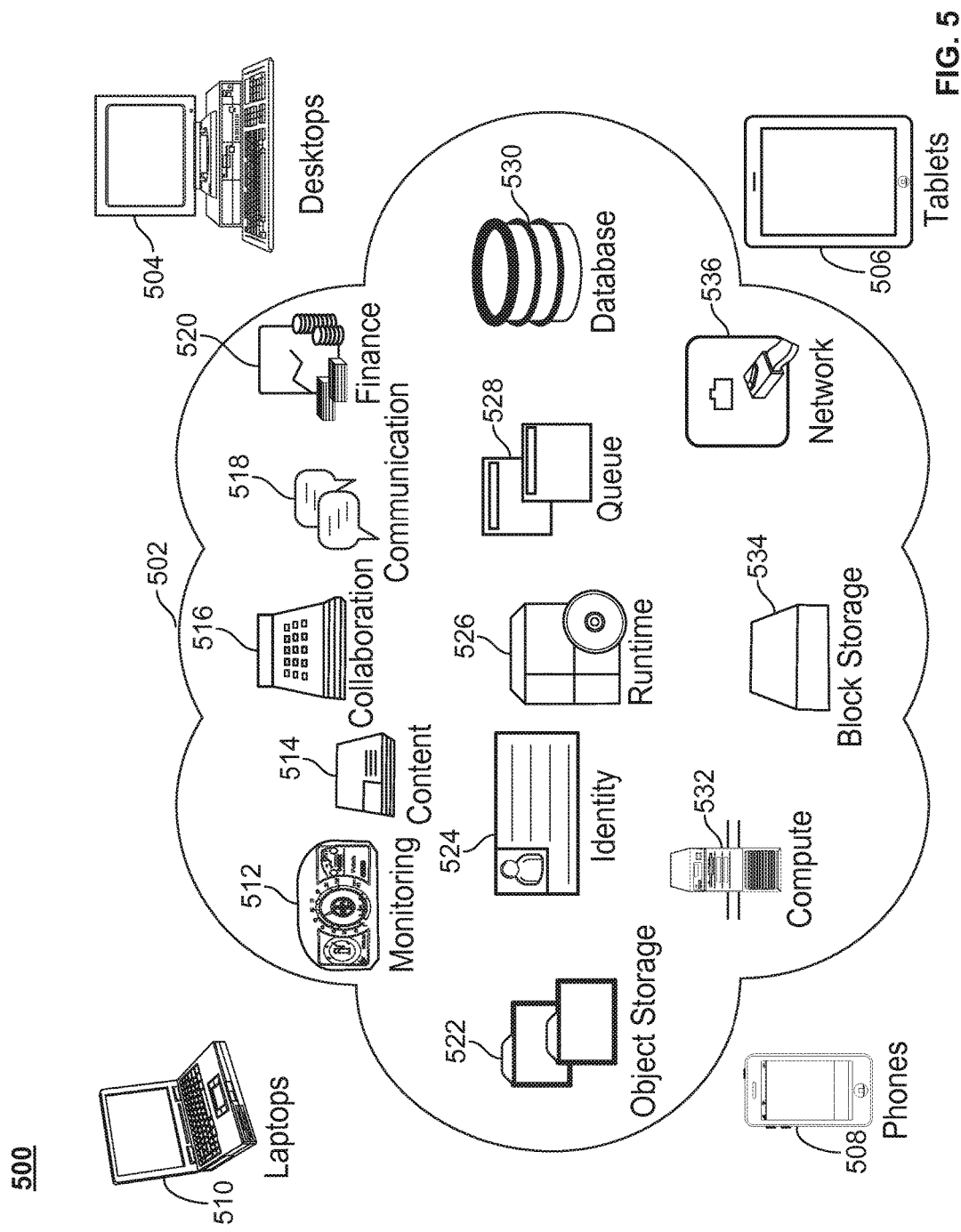
FIG. 5 shows an illustrative diagram of interactive media devices and a network of components for fulfilling data requests from the interactive media devices, in accordance with some embodiments of the disclosure.

FIG. 5 shows illustrative diagram 500 of interactive media devices 504, 506, 508, and 510 and a network 502 of software and/or hardware components 512-536 for fulfilling data requests from the interactive media devices. Network 502 may be a server-client network, a cloud-based network, or another suitable network. Interactive media devices 504-510 may correspond to one or more devices in FIG. 4. For example, user computer equipment 404 may include desktop 504, laptop 510, or another suitable user computer equipment. In another example, wireless user communications device 406 may include tablet 506, smart phone 508, or another suitable wireless user communications device. Components 512-536 may correspond to one or more devices in FIG. 4. For example, database 530 may include media content source 416, media guidance data source 418, or another suitable source.

In some embodiments, a data request received from one of the end-user devices 504-510, e.g., a request for an audio packet, a video packet, or another suitable data request, traverses through multiple software and/or hardware components 512-536 in network 502 in order to be fulfilled. For example, a data request from smart phone 508 is received by server component 532 in network 502. Server component 532 relays the data request to components 530, 522, and 514 in network 502 to retrieve the requested data packet and respond to smart phone 508 with the requested data packet. In this example, network 502 is serving a large number of data requests from, e.g., other interactive media devices 504, 506, and 510, in a short period of time and experiences a delay in fulfilling the data request for smart phone 508.

As the data request traverses components 532, 530, 522, and 514 in network 502, a fingerprint including a tracking identifier is generated and updated as the data request passes through each component in the network. The tracking identifier is associated with the data request and includes information regarding the component that received the data request. The tracking identifier uniquely identifies the physical state and/or temporal state of each component that received the data request.

In order to address the network delay, a troubleshooting system relies on the tracking identifier associated with the data request to determine the source of the issue. The troubleshooting system reviews which resources have potentially caused the delay in fulfilling the data request. In this example, the troubleshooting system determines an application running on component 514 experienced a fault and resulted in the delay. The troubleshooting system automatically plans ahead based on this information in the tracking identifier. In this example, the troubleshooting system reduces the frequency of data requests in order to allow component 514 to satisfy the data requests in a timely manner. The troubleshooting system instructs server component 532 that initially receives data requests to reroute additional data requests to other components in network 502.

Figure 6:
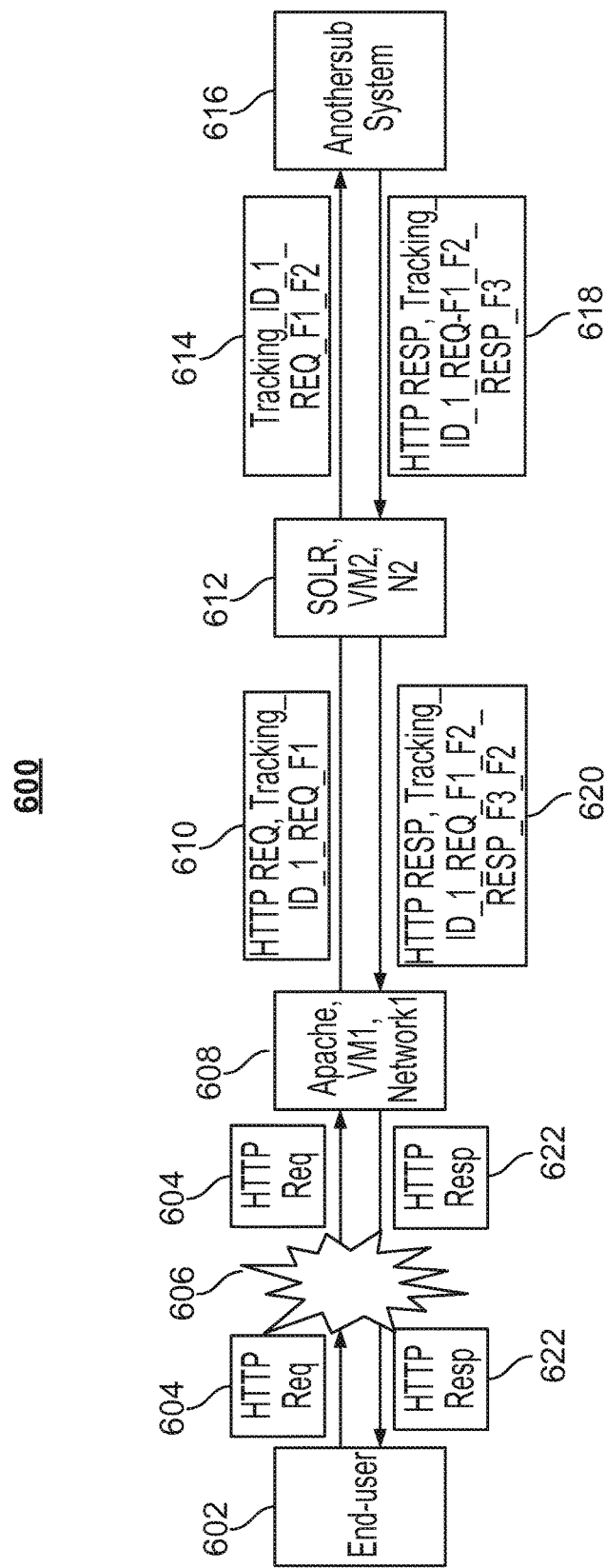
FIG. 6 shows an illustrative diagram of a data request and an associated tracking identifier as the data request traverses components in the network, in accordance with some embodiments of the disclosure.

FIG. 6 shows illustrative diagram 600 of data request 604 received over Internet 606 from interactive media device 602 and associated tracking identifiers 610, 614, 618, 620 as data request 604 traverses components 608, 612, and 616 in network 502. In order to address the network issues, the troubleshooting system may rely on information associated with data request 604 to determine the source of the issues. The troubleshooting system may automatically analyze the network issues based on information received from one or more hardware and/or software modules distributed in the network. Particularly, the data request may be associated with a fingerprint including a plurality of tracking identifiers that track the network components 608, 612, and 616 that data request 604 traversed through in order to generate data response 622 and provides information regarding the network components. The fingerprint may be retrieved in response to an API call from the troubleshooting system. For example, the fingerprint includes tracking identifier 610 of network component 608 that received data request 604 including information related to one or more applications running on the component, the infrastructure of the component, compute capabilities of the component, storage capabilities of the component, network capabilities of the component, and other suitable information. Tracking identifier 610 uniquely identifies the physical state and/or temporal state of component 608. The troubleshooting system may review the information in the tracking identifier to automatically identify issues that may have resulted in delay and/or failure in fulfilling the data request.

The information in tracking identifier 610 may help track network components data request 604 has traversed. Particularly, the troubleshooting system may review which resources may have potentially caused the delay and/or failure in fulfilling the data request. For example, an application "Apache" running on network component 608 may have experienced a fault and resulted in the error. In another example, a physical device of network component 608, such as network adapter "Network1," may have experienced a fault and resulted in the error. The troubleshooting system may automatically plan ahead based on the information in the tracking identifier. For example, the troubleshooting system may reroute data requests based on the gathered information while the network component is repaired. In another example, the troubleshooting system may reduce the frequency of data requests based on the gathered information in order to allow the network component to satisfy the data requests in a timely manner.

In some embodiments, a tracking identifier generation module is implemented on user equipment device 300 including control circuitry 304. Control circuitry 304 receives tracking identifier 610 from component 612 in network 502. For example, component 612 may be media content source 416, media guidance data source 418, or another suitable network component. Tracking identifier 610 is related to data request 604 received at component 612 and may have been transmitted along with or separate from data request 604. Tracking identifier 610 includes a data structure (e.g., tracking identifier 700 in FIG. 7) having information regarding prior component 608 in network 502 that data request 604 has previously traversed. For example, tracking identifier 610 may include information regarding component 608 in network 502 that first received data request 604 from interactive media device 602. Component 608 then relayed data request 604 along with tracking identifier 610 including component 608's information to component 612.

Tracking identifier 610 includes information regarding component 608 that received data request 604 including information related to one or more applications running on component 608, the infrastructure of component 608, compute parameters of component 608, storage parameters of component 608, network parameters of component 608, and other suitable parameters. The application parameters may include information regarding the application on component 608 including name, active connections, cache size, process identifier, CPU usage, memory usage, and other suitable information. The infrastructure parameters may include information regarding one or more of the compute capabilities, the storage capabilities, network capabilities of component 608, and other suitable information. The compute parameters may include overall CPU usage, number of threads being executed, cache usage, temperature, and other suitable information. The storage parameters may include disk space size, disk space used, disk space available, and other suitable information. The network parameters may include IP address, port number, network type, input/output type, and other suitable information. The tracking identifier may include information regarding the application stack for the component. By capturing such information in the tracking identifier, control circuitry 304 may allow for uniquely identifying the physical state and/or temporal state of component 608.

Subsequent to receiving tracking identifier 610 containing information regarding prior component 608 through which data request 604 has traversed, control circuitry 304 may identify parameters related to component 612. Control circuitry 304 may update tracking identifier 610 to include information for uniquely identifying the physical state and/or temporal state of component 612, e.g., information regarding the application stack of component 612. Control circuitry 304 may identify the parameters based on the configuration of component 612. For example, the identified parameters may be a subset of the configuration of component 612, such as infrastructure parameters, compute parameters, storage parameters, network parameters, application parameters, and other suitable parameters. The configuration may be retrieved from component 612, a database within network 502, or another suitable source. In some embodiments, the identified parameters may be determined based on the type of data request 604 associated with tracking identifier 610. For example, the identified parameters for a video packet request may include application parameters for a video related application and related hardware running the video related application. In another example, the identified parameters for an audio packet request may include application parameters for an audio related application and related hardware running the audio related application. Control circuitry 304 may request and receive information related to the identified parameters from component 612. Control circuitry 304 may update the data structure of tracking identifier 610 to include the received information regarding the component 612 and create tracking identifier 614.

Component 612 that received data request 604 passes the request to component 616 in network 602 along with updated tracking identifier 614. Component 616 may subsequently send the received tracking identifier 614 to the tracking identifier generation module to include information regarding component 616. Tracking identifier 614 may be updated to also include information regarding a physical state and/or a temporal state of component 616 as well. As such, tracking identifier 614 may be updated to tracking identifier 618 that includes information related to components 608, 612, and 616 through which data request 604 passes in network 502.

In some aspects, the tracking identifier is generated by a combination of software and/or hardware modules distributed in the network. In some embodiments, the tracking identifier is generated by a software module implemented on each component in the network. In some embodiments, the tracking identifier is generated by a hardware module implemented on each component in the network. In some embodiments, the tracking identifier is generated by a stand-alone component in the network. The stand-alone component may include hardware and/or software to receive tracking identifiers and update them with information regarding the latest component that received the data request associated with the tracking identifier.

FIG. 7 shows an illustrative embodiment of tracking identifier 700 associated with a data request. Tracking identifier 700 may be retrieved from a component having received a data request related to tracking identifier 700. Tracking identifier 700 may be included in a database, kept as a separate file, or stored and/or retrieved in any other suitable manner. Tracking identifier 700 may include a plurality of fields.

In the illustrated embodiment, tracking identifier 700 includes fields 702-764. Field 702 indicates the beginning of the tracking identifier and field 764 indicates the end of the tracking identifier. Field 704 identifies a data request related to tracking identifier 700. Field 706 indicates the beginning of a component configuration and field 756 indicates the end of the component configuration. The component configuration uniquely identifies a physical state and/or temporal state for component "F1" as indicated in field 708. Field 758 indicates the beginning of a component configuration and field 762 indicates the end of the component configuration. The component configuration uniquely identifies a physical state and/or temporal state for component "F2" as indicated in field 760.

Tracking identifier 700 includes information regarding the component that received the data request including information related to one or more applications 710-724 running on the component, the infrastructure of the component, compute parameters 726-732 of the component, storage parameters 734-742 of the component, network parameters 744-754 of the component, and other suitable parameters. The application parameters may include information regarding the application on the server including name 712, active connections 714, cache size 716, process identifier 718, CPU usage 720, memory usage 722, and other suitable information. The infrastructure parameters may include information regarding one or more of the compute capabilities, the storage capabilities, network capabilities of the server, and other suitable information. The compute parameters may include overall CPU usage 728, number of threads being executed 730, cache usage, temperature, and other suitable information. The storage parameters may include disk space size 736, disk space used 738, disk space available 740, and other suitable information. The network parameters may include IP address 746, port number 748, network type 750, input/output type 752, and other suitable information.

In some embodiments, tracking identifier 700 is received by control circuitry 304 as described with reference to step 802 in FIG. 8. Component 616 may subsequently send the received tracking identifier 614 to the tracking identifier generation module to include information regarding component 616.

Figure 8:
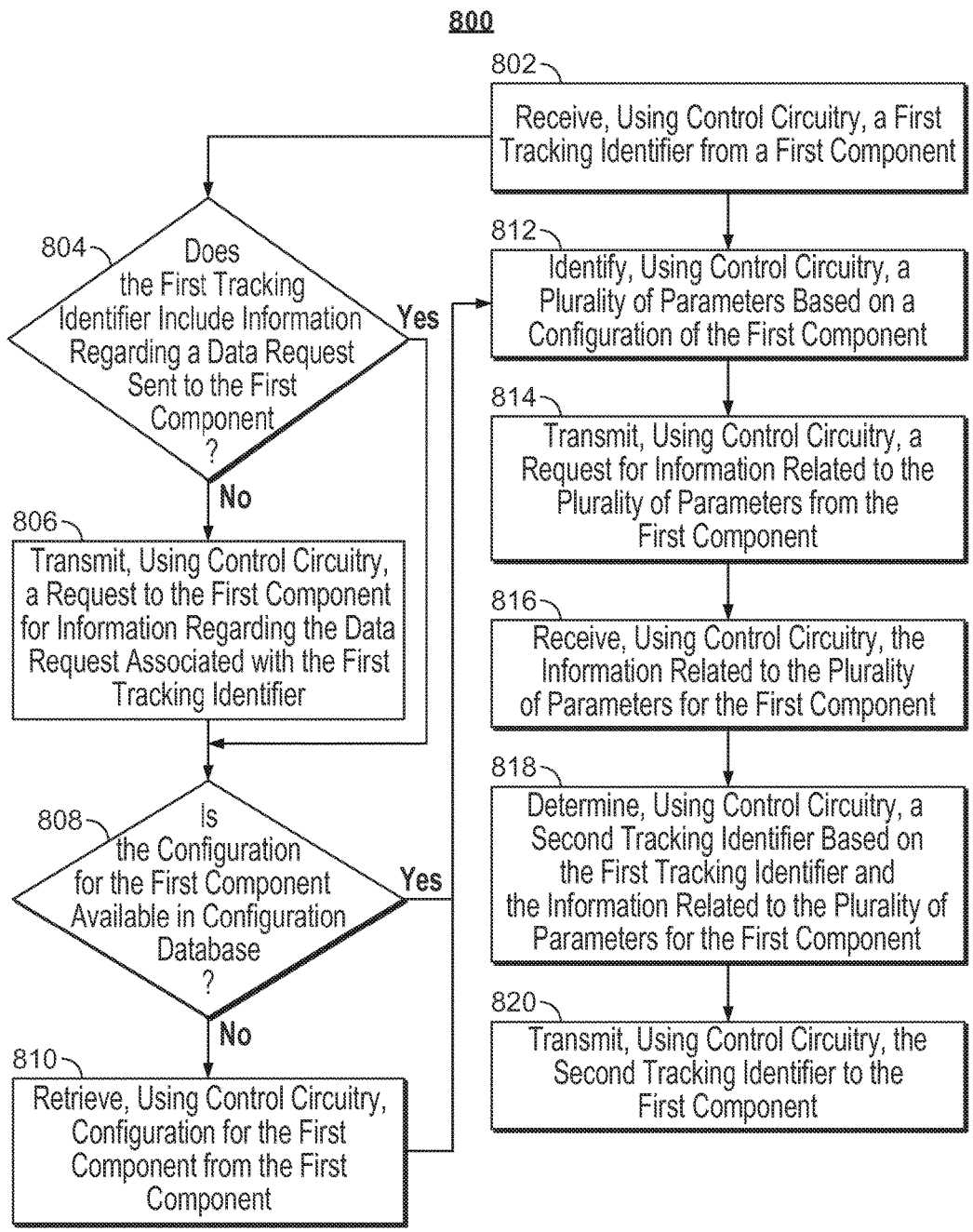
FIG. 8 shows a flow diagram of illustrative steps involved in generating a tracking identifier in a network, in accordance with some embodiments of the disclosure.

FIG. 8 shows flow diagram 800 of illustrative steps 802-820 involved in generating a tracking identifier in a network. The tracking identifier generation module includes control circuitry, e.g., control circuitry 304, which receives a tracking identifier from a component in the network at step 802. For example, the component may be media content source 416, media guidance data source 418, or another suitable network component. The tracking identifier is related to a data request received at the component and may be transmitted along with or separate from the data request. The tracking identifier may include a data structure (e.g., tracking identifier 700 in FIG. 7) having information regarding all prior components in the network that the data request has traversed. For example, the tracking identifier may include information regarding a component in the network that first received the data request from an end user's smart phone. The component may then have relayed the data request along with the tracking identifier including the component's information to the component under consideration. Tracking identifiers for multiple components may be combined to form a fingerprint. Tracking identifiers may be generated at each processing level including processor, storage, application software, and other suitable levels. The tracking identifiers may be combined to generate a unique fingerprint in connection with the data request.

For example, the fingerprint may include the tracking identifier of the component that first received the data request. The tracking identifier may include information related to one or more applications running on the component, the infrastructure of the component, compute parameters of the component, storage parameters of the component, network parameters of the component, and other suitable parameters. The application parameters may include information regarding the application on the component including name, active connections, cache size, process identifier, CPU usage, memory usage, and other suitable information. The infrastructure parameters may include information regarding one or more of the compute capabilities, the storage capabilities, network capabilities of the component, and other suitable information. The compute parameters may include overall CPU usage, number of threads being executed, cache usage, temperature, and other suitable information. The storage parameters may include disk space size, disk space used, disk space available, and other suitable information. The network parameters may include IP address, port number, network type, input/output type, and other suitable information. The tracking identifier may include information regarding the application stack for the component. By capturing such information in the tracking identifier, control circuitry 304 may allow for uniquely identifying the physical state and/or temporal state of the component.

At step 802, control circuitry 304 determines whether the tracking identifier includes information regarding a data request sent to the component under consideration. If the information regarding the data request is found, control circuitry 304 proceeds to step 808. If the information regarding the data request is not found, control circuitry 304 sends a request to the component under consideration for information regarding the data request associated with the tracking identifier.

At step 808, control circuitry 304 determines whether the configuration for the component under consideration is available in a configuration database. The configuration database may store configurations for one or more components in the network. If the configuration for the component is found, control circuitry 304 proceeds to step 812. If the configuration for the component is not found, control circuitry 304 retrieves the configuration for the component under consideration from the component itself.

At step 812, subsequent to receiving the tracking identifier containing information regarding prior components the related data request has traversed, control circuitry 304 of the tracking identifier generation module identifies parameters related to the component under consideration. Control circuitry 304 may update the tracking identifier to include information for uniquely identifying the physical state and/or temporal state of the component, e.g., information regarding the application stack of the component. Control circuitry 304 may identify the parameters based on the configuration of the component. For example, the identified parameters may be a subset of the configuration of the component, such as infrastructure parameters, compute parameters, storage parameters, network parameters, application parameters, and other suitable parameters. The configuration may be retrieved from the component itself, a database within the network, or another suitable source. In some embodiments, the identified parameters may be determined based on the type of data request associated with the tracking identifier. For example, the identified parameters for a video packet request may include application parameters for a video related application and related hardware running the video related application. In another example, the identified parameters for an audio packet request may include application parameters for an audio related application and related hardware running the audio related application.

At step 814, control circuitry 304 transmits a request for information related to the identified parameters from the component. For example, control circuitry 304 may request information related to parameters as specified in fields 710-754 of tracking identifier 700. At step 816, control circuitry 304 receives information related to the identified parameters from the component. For example, control circuitry 304 may receive information related to parameters as specified in fields 710-754 of tracking identifier 700. At step 818, control circuitry 304 determines an updated tracking identifier based on the received tracking identifier and the information related to the identified parameters from the component. For example, control circuitry 304 may update the data structure of the tracking identifier to include the received information regarding the component under consideration to produce the updated tracking identifier. At step 820, control circuitry 304 transmits the updated tracking identifier to the component that received the data request.

In some embodiments, the component that received the data request passes the request to another component in the network along with the updated tracking identifier. This component may subsequently send the received tracking identifier to the tracking identifier generation module to include information regarding the component. The tracking identifier may be updated to also include information regarding a physical state and/or a temporal state of this component as well. As such, the tracking identifier may be updated to include information related to components through which the data request passes in the network.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real-time. It should also be noted, the systems and/or methods described above may be applied to, or used in accordance with, other systems and/or methods.

What is claimed is:

1. A method for generating tracking identifiers in a network, comprising:
   receiving, using control circuitry, a first tracking identifier from a first component of the network, wherein the first tracking identifier is associated with a data request sent to the first component;
   identifying, using the control circuitry, a plurality of parameters based on a configuration of the first component of the network;
   transmitting, using the control circuitry, an application programming interface (API) request for information related to the plurality of parameters from the first component of the network;
   receiving, using the control circuitry, the information related to the plurality of parameters for the first component of the network in response to the API request;
   determining a type of a plurality of types associated with the data request sent to the first component by retrieving a parameter type included in the data request;
   selecting a portion of the received information based on the determined type associated with the data request;
   generating, using the control circuitry, a second tracking identifier based on the first tracking identifier and the selected portion of the received information related to the plurality of parameters for the first component of the network;
   transmitting, using the control circuitry, the second tracking identifier to the first component of the network; and
   transferring the second tracking identifier to another component of the network, wherein the second tracking identifier informs the another component of the network about each component of the network, including the first component, which has received the data request and transmitted the data request.

2. The method of claim 1, wherein the first tracking identifier and the second tracking identifier are combined to generate a fingerprint in connection with the data request.

3. The method of claim 1, wherein the first tracking identifier includes information regarding prior components of the network that the data request has passed through prior to the first component.

4. The method of claim 3, wherein the first tracking identifier includes a data structure having information related to at least one of an application of the prior components, a processor of the prior components, a storage device of the prior components, and a network interface of the prior components.

5. The method of claim 3, wherein the first tracking identifier uniquely identifies at least one of a physical state and a temporal state for the prior components of the network.

6. The method of claim 1, wherein the configuration of the first component is retrieved from one of the first component and a database identifying components of the network.

7. The method of claim 1, wherein generating the second tracking identifier comprises modifying the first tracking identifier to include at least a portion of the information related to the plurality of parameters for the first component of the network.

8. The method of claim 1, wherein the configuration of the first component of the network includes at least one of infrastructure parameters, compute parameters, storage parameters, network parameters, and application parameters.

9. The method of claim 1, further comprising:
   receiving, using the control circuitry, the second tracking identifier from a second component of the network, wherein the second tracking identifier is associated with the data request passing from the first component to the second component.

10. The method of claim 9, further comprising:
    modifying, using the control circuitry, the second tracking identifier to include information related to the second component of the network, thereby including information related to the first component and the second component through which the data request has passed.

11. A system for generating tracking identifiers in a network, comprising:
    a network interface;
    control circuitry, in communication with the network interface, configured to:
      receive, via the network interface, a first tracking identifier from a first component of the network, wherein the first tracking identifier is associated with a data request sent to the first component;
      identify a plurality of parameters based on at least one of the first tracking identifier and a configuration of the first component of the network;
      transmit, via the network interface, an application programming interface (API) request for information related to the plurality of parameters from the first component of the network;
      receive, via the network interface, the information related to the plurality of parameters for the first component of the network in response to the API request;
      determine a type of a plurality of types associated with the data request sent to the first component by retrieving a parameter type included in the data request;
      select a portion of the received information based on the determined type associated with the data request;
      generate a second tracking identifier based on the first tracking identifier and the selected portion of the received information related to the plurality of parameters for the first component of the network;
      transmit, via the network interface, the second tracking identifier to the first component of the network; and
      transfer the second tracking identifier to another component of the network, wherein the second tracking identifier informs the another component of the network about each component of the network, including the first component, which has received the data request and transmitted the data request.

12. The system of claim 11, wherein the first tracking identifier and the second tracking identifier are combined to generate a fingerprint in connection with the data request.

13. The system of claim 11, wherein the first tracking identifier includes information regarding prior components of the network that the data request has passed through prior to the first component.

14. The system of claim 13, wherein the first tracking identifier includes a data structure having information related to at least one of an application of the prior components, a processor of the prior components, a storage device of the prior components, and a network interface of the prior components.

15. The system of claim 13, wherein the first tracking identifier uniquely identifies at least one of a physical state and a temporal state for the prior components of the network.

16. The system of claim 11, wherein the configuration of the first component is retrieved from one of the first component and a database identifying components of the network.

17. The system of claim 11, wherein control circuitry configured to generate the second tracking identifier comprises control circuitry configured to modify the first tracking identifier to include at least a portion of the information related to the plurality of parameters for the first component of the network.

18. The system of claim 11, wherein the configuration of the first component of the network includes at least one of infrastructure parameters, compute parameters, storage parameters, network parameters, and application parameters.

19. The system of claim 11, wherein the control circuitry is further configured to:
    receive the second tracking identifier from a second component of the network, wherein the second tracking identifier is associated with the data request passing from the first component to the second component.

20. The system of claim 19, wherein the control circuitry is further configured to:
    modify the second tracking identifier to include information related to the second component of the network, thereby including information related to the first component and the second component through which the data request has passed.

21. The method of claim 1, further comprising updating the first tracking identifier to include information for uniquely identifying a physical state of the first component.

22. The system of claim 11, wherein the control circuitry is further configured to update the first tracking identifier to include information for uniquely identifying a physical state of the first component.

* * * * *